(12) United States Patent  
Baudard

(10) Patent No.: US 6,522,241 B1  
(45) Date of Patent: Feb. 18, 2003

(54) MOTOR VEHICLE EQUIPPED WITH A SO-CALLED "HANDS-FREE" ACCESS SYSTEM

(75) Inventor: Xavier Baudard, Paris (FR)

(73) Assignee: Valeo Securite Habitacle, Creteil (FR)

( * ) Notice: Subject to any disclaimer, the term of this patent is extended or adjusted under 35 U.S.C. 154(b) by 0 days.

(21) Appl. No.: 09/544,140

(22) Filed: Apr. 6, 2000

(30) Foreign Application Priority Data

Apr. 6, 1999 (FR) .............................................. 99 04242

(51) Int. Cl.⁷ .............................................. G05B 19/00
(52) U.S. Cl. ..................... 340/5.61; 340/5.72; 340/426; 340/539; 340/825.69; 340/825.72; 307/10.1; 307/10.2
(58) Field of Search ............................... 340/5.61, 5.72, 340/426, 539, 825.69, 825.72; 307/10.1, 10.2

(56) References Cited

U.S. PATENT DOCUMENTS 6,208,239 B1 * 3/2001 Muller et al. ................ 340/426  
6,211,776 B1 * 4/2001 Röhrl et al. ................. 340/426  
6,323,566 B1 * 11/2001 Meier ......................... 307/10.2

FOREIGN PATENT DOCUMENTS

DE 19542441 A 5/1997  
EP 0735219 A 10/1996  
FR 2771358 A 5/1999  
GB 2310300 A 8/1997

* cited by examiner

Primary Examiner—Brian Zimmerman  
Assistant Examiner—Yves Dalencourt  
(74) Attorney, Agent, or Firm—Liniak, Berenato & White

(57) ABSTRACT

An identification device for controlling locking of the opening leaves of the vehicle. The identification device is capable of remotely exchanging data with an identifier carried by a user, so as to allow access to the vehicle. The identification device is connected to a number of external antennas so as to allow dialog between identification device and the identifier. At least one pair of the external antennas have a common area of overlap, so that the identification device is able to detect the presence of an identifier in the common area of overlap when the pair of antennas receives a signal from the same identifier. Each antennas of the pair also has its own area of coverage without any mutual overlap, so that the identification device is capable of detecting the presence of an identifier in one of the two aforementioned areas of coverage.

9 Claims, 1 Drawing Sheet

MOTOR VEHICLE EQUIPPED WITH A SO-CALLED "HANDS-FREE" ACCESS SYSTEM

BACKGROUND OF THE INVENTION

1. Field of the Invention

The present invention relates to a motor vehicle equipped with a so-called "hands-free" access system.

2. Description of Related Art

In such a system, an identification device is installed on the vehicle, to control the means for locking the opening leaves of the vehicle, this identification device being capable of remotely exchanging data with an identifier worn or carried by a user, so as to allow access to the vehicle when the identifier has been authenticated by the identification device. To allow dialog between the identification device and the identifier, a number of antennas are distributed around the periphery of the vehicle, so as to detect the presence of the identifier. Such antennas are, for example, arranged in the rear-view mirror, the door handles and the door uprights. When the identifier is moved away from the area of coverage of said external antennas, the system automatically locks the opening leaves of the vehicle.

Furthermore, these systems may control the starting of the engine of the vehicle, when a person authorized to drive the vehicle is inside the cabin. In this case, antennas are arranged, for example, on the instrument panel, in the seats of the vehicle or on the interior walls of the doors.

However, the number of antennas to be installed on the vehicle has become great, increasing the cost and time involved in mounting the system on the vehicle.

Incidentally, the present applicant company has, in document FR-A-2 740 501, described a "hands-free" access system in which two antennas are arranged at the rear of the vehicle, in the region of the trunk, so that the areas of coverage of the two rear antennas have little or no overlap, so that the transponder worn or carried by a user can dialog with just one antenna at a time. The unlocking of the lid to the trunk is commanded when the transponder is presented to the two rear antennas of the vehicle in a predetermined sequence.

SUMMARY OF THE INVENTION

The object of the invention is to eliminate the aforementioned drawbacks and provide a motor vehicle equipped with a "hands-free" access system in which the number of antennas needed is lower, while at the same time having correct coverage of the vehicle environment.

To this end, the subject of the invention is a motor vehicle equipped with an identification device for controlling means for locking the opening leaves of the vehicle, said identification device being capable of remotely exchanging data with an identifier worn or carried by a user, so as to allow access to the vehicle when the identifier has been authenticated by the identification device, the latter being connected to a number of external antennas on the vehicle so as to allow dialog between the identification device and the identifier, when the latter is positioned in the area of coverage of said antennas, wherein at least one pair of said external antennas comprises a common area of overlap, so that the identification device is able to detect the presence of an identifier in said common area of overlap when said pair of antennas receives a signal from the same identifier, each antenna of said pair of antennas also comprising its own area of coverage without any mutual overlap, so that the identification device is capable of detecting the presence of an identifier in one of the two aforementioned areas of coverage when the associated antenna receives only a signal from the identifier.

Advantageously, the two antennas of each pair are arranged one on each opposite side of the vehicle, so that each antenna has its own area of coverage extending over one of the two sides of the vehicle so that the identification device is able to detect the presence of the identifier in proximity to a door located on one of the two sides of the vehicle, so as to control means for locking the doors. As a preference, the antennas of said pair are arranged symmetrically with respect to the longitudinal axis of the vehicle.

In a first embodiment, a pair of antennas is arranged at the rear of the vehicle, so that the common area of overlap extends toward the rear of the trunk lid, detection of an identifier in said common area of overlap, by the two antennas, being intended to control locking/unlocking the trunk lid only.

By way of example, said pair of antennas may be installed in the rear bumper, the rear lights, or the rear side moldings of the vehicle.

In another embodiment, one pair of antennas is arranged practically in the middle of the sides of the vehicle, so that the common area of overlap extends inside the cabin of the vehicle, so as to allow the identification device to detect the presence of an identifier in the cabin so as, for example, to control the inhibiting of a means for preventing the vehicle from being started.

Advantageously, said pair of antennas is installed in the handles of doors or in the door surround pillars.

In general, the external antennas are intended to emit at low frequency, for example at 125 kHz, whereas the identifiers are capable of responding by emitting in radio frequency, for example at 434 MHz.

BRIEF DESCRIPTION OF THE DRAWINGS

To provide a better understanding of the subject of the invention, two embodiments thereof, depicted in the appended drawing, will now be described by way of purely illustrative and nonlimiting examples.

In this drawing.

DETAILED DESCRIPTION OF PREFERRED EMBODIMENTS

Figure 1:
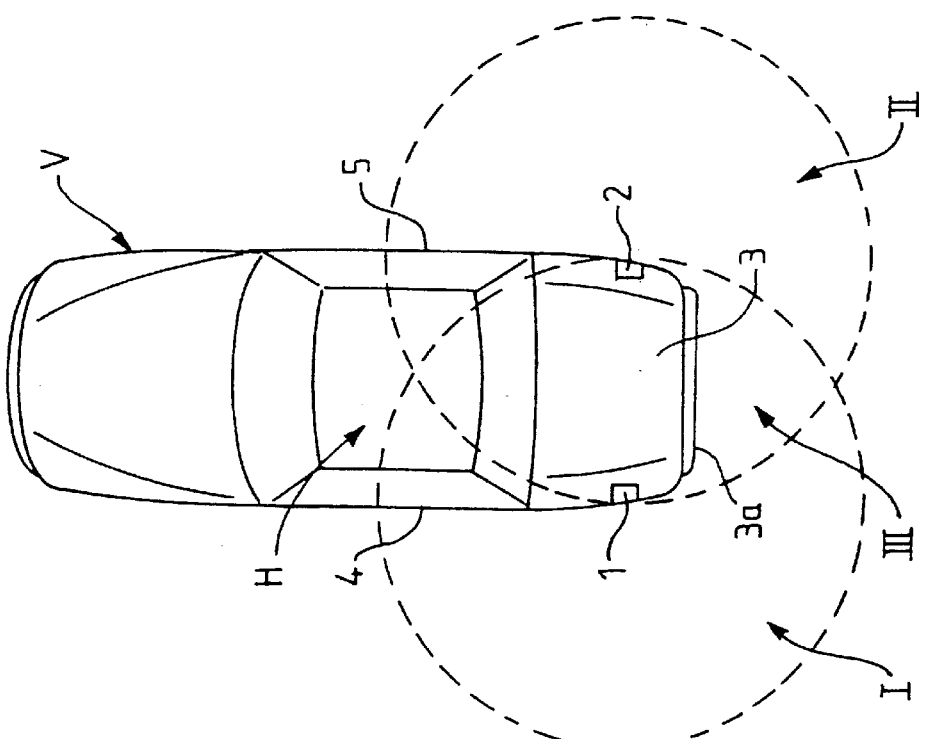
FIG. 1 is a diagrammatic view from above of a first embodiment of the vehicle according to the invention.

In FIG. 1, the vehicle V comprises two laterally opposed antennas 1, 2 located at the rear of the vehicle, in the region of the trunk lid 3, each external antenna 1, 2 having its own area of coverage I, II, extending on each respective side of the vehicle. The area of coverage I is intended to at least partially encompass the side doors 4, on one side of the vehicle, while the area of coverage II is intended to encompass the side doors 5 on the opposite side of the vehicle. The two antennas 1, 2 also comprise a mutual area of overlap III, extending toward the rear of the trunk lid 3.

This area 3 represents the area for detecting that a user is approaching/retreating from the trunk lid 3.

Although the area of coverage of the antennas 1, 2 may in part extend into the cabin H of the vehicle, through the windows in the doors and the rear screen of the vehicle, the area of coverage of the antennas 1, 2 extends at most only into the rear part of the cabin, which means that they are unable to detect the presence of an identifier worn or carried by a user in the cabin. Furthermore, the antennas 1 and 2 are not able to eliminate the use of an antenna inside the trunk because, in general, the walls of the trunk do not allow electromagnetic waves to be transmitted into the trunk.

By way of example, the antennas 1, 2 could be installed at two lateral ends of the rear bumper 3*a*, or alternatively in the rear lights of the vehicle, or alternatively still, in the rear side moldings of the vehicle.

Thus, by virtue of this particular installation of the antennas, it is possible to dispense with the external antenna for detecting the area of coverage outside the trunk, because the two lateral antennas 1, 2 are capable simultaneously of making the distinction between an identifier approaching each side of the vehicle and an identifier approaching the rear of the vehicle. In effect, for an approach to the rear of the vehicle, the two antennas 1, 2 both have to receive a signal from the identifier. Furthermore, it is possible to make a distinction between the user approaching the vehicle from one side or from the other, depending on whether it is the antenna 1 or the antenna 2 which receives a signal from the identifier.

Figure 2:
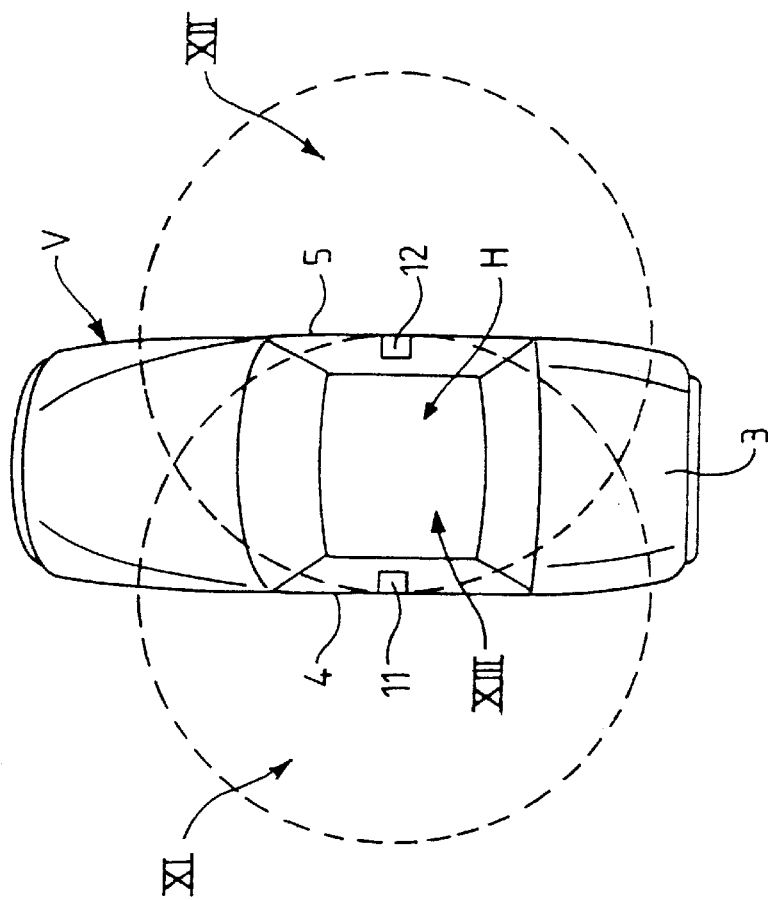
FIG. 2 is a view similar to FIG. 1 but according to an alternative form.

In the alternative form of FIG. 2, two lateral antennas 11, 12 are installed on the pillars at the center of the vehicle, or, for example, between the front and rear doors, or alternatively in the front door door handles. Each antenna 11, 12 has its own area of coverage XI and XII respectively, to detect the presence of an identifier on each side of the vehicle. The common area of overlap XIII encompasses the cabin H of the vehicle, as clearly depicted in FIG. 2, which makes it possible to detect the presence of an identifier in the cabin when the two antennas 11, 12 both simultaneously detect a signal coming from the same identifier. In this alternative form, it is thus possible to dispense with the antenna inside the vehicle cabin, because the two external antennas 11, 12 can be used both to detect the presence of an identifier in the cabin and to detect the approach/retreat of an identifier with respect to the doors of the vehicle.

Of course, the two alternative forms illustrated in FIGS. 1 and 2 may be combined. In this case, the approach/retreat of a user with respect to the door 4 of the vehicle may be detected by a signal from the same identifier received by the antennas 1, 11 simultaneously.

As a preference, the antennas of each pair 1, 2 or 11, 12 are spaced apart by approximately the width of the vehicle.

Although the invention has been described in conjunction with a number of particular embodiments, it is quite obvious that it is not in any way restricted thereto and that it comprises all technical equivalents of the means described and combinations thereof where these fall within the scope of the invention.

What is claimed is:

1. A motor vehicle (V) equipped with an identification device for controlling means comprising means for locking the opening leaves (3–5) and/or means for preventing the starting of the vehicle, said identification device remotely exchanging data with an identifier worn or carried by a user, so as to allow access to the vehicle when the identifier has been authenticated by the identification device, the identification device being connected to a number of external antennas (1, 2; 11, 12) on the vehicle so as to allow dialog between the identification device and the identifier, when the identifier is positioned in the area of coverage of said antennas, wherein at least one pair (1, 2; 11, 12) of said external antennas comprises a common area of overlap (III, XIII), so that the identification device is able to detect the presence of an identifier in said common area of overlap with a view to said device controlling a given means when said pair of antennas receives a signal from the same identifier, each antenna of said pair of antennas also comprising its own area of coverage (I, II; XI, XII) without any mutual overlap, so that the identification device is capable of detecting the presence of an identifier in one of the two aforementioned areas of coverage with a view to said device controlling a means other than the aforementioned given means when the associated antenna receives only a signal from the identifier.

2. The vehicle as claimed in claim 1, wherein the two antennas (1, 2; 11, 12) of each pair are arranged one on each opposite side of the vehicle, so that each antenna has its own area of coverage extending over one of the two sides of the vehicle so that the identification device is able to detect the presence of the identifier in proximity to a door (4, 5) located on one of the two sides of the vehicle, so as to control means for locking the doors.

3. The vehicle as claimed in claim 2, wherein the antennas of said pair are arranged symmetrically with respect to the longitudinal axis of the vehicle.

4. The vehicle as claimed in claim 1, wherein a pair of antennas (1, 2) is arranged at the rear of the vehicle, so that the common area of overlap (III) extends toward the rear of the trunk lid (3), detection of an identifier in said common area of overlap, by the two antennas, being intended to control means for locking/unlocking the trunk lid only.

5. The vehicle as claimed in claim 4, wherein said pair of antennas (1, 2) is installed in the rear bumper (3*a*), the rear lights, or the rear side moldings of the vehicle.

6. The vehicle as claimed in claim 1, wherein one pair of antennas (11, 12) is arranged practically in the middle of the sides of the vehicle, so that the common area of overlap (XIII) extends inside the cabin (H) of the vehicle, so as to allow the identification device to detect the presence of an identifier in the cabin so as to control the inhibiting of a means for preventing the vehicle from being started.

7. The vehicle as claimed in claim 6, wherein said pair of antennas (11, 12) is installed in the handles of doors (4, 5) or in the door surround pillars.

8. The vehicle as claimed in claim 1, wherein the external antennas (1, 2; 11, 12) are intended to emit at low frequency, whereas the identifiers are capable of responding by emitting in radio frequency.

9. The vehicle as claimed in claim 1, wherein said low frequency is about 125 kHz and said radio frequency is about 434 MHz.

* * * * *